United States Patent [19]

Garino

[11] Patent Number: 5,639,296
[45] Date of Patent: Jun. 17, 1997

[54] THIXOTROPIC PARTICLES SUSPENSIONS AND METHOD FOR THEIR FORMATION

[75] Inventor: Terry J. Garino, Albuquerque, N.M.

[73] Assignee: Sandia Corporation, Albuquerque, N.M.

[21] Appl. No.: 328,625

[22] Filed: Oct. 25, 1994

[51] Int. Cl.$^6$ .................................................. C09C 1/22
[52] U.S. Cl. .................... 106/456; 106/400; 106/401; 106/311; 106/460; 252/62.52
[58] Field of Search ................ 252/62.52; 106/456, 106/460, 400, 401, 311

[56] References Cited

U.S. PATENT DOCUMENTS

| | | | |
|---|---|---|---|
| 2,751,352 | 6/1956 | Bondi | 252/62.52 |
| 4,950,416 | 8/1990 | Baxter | 252/99 |
| 5,106,881 | 4/1992 | Inoue et al. | 521/54 |
| 5,167,850 | 12/1992 | Shtarkman | 252/62.52 |
| 5,185,177 | 2/1993 | Kijima et al. | 501/104 |

OTHER PUBLICATIONS

Kirk–Othmer, *Encyclopedia Of Chemical Technology*, Third Ed. vol. 20, pp. 259–319. Dec. 1982.

*Primary Examiner*—Mark L. Bell
*Assistant Examiner*—Scott L. Hertzog
*Attorney, Agent, or Firm*—Pravel, Hewitt, Kimball & Krieger

[57] ABSTRACT

Thixotropic particle suspensions are prepared by controlling the quantity of dispersant composition used for particle coating to an amount which is less than that quantity that would provide a full coating of dispersant on all particles suspended.

18 Claims, 5 Drawing Sheets

THIXOTROPIC PARTICLES SUSPENSIONS AND METHOD FOR THEIR FORMATION

The United States Government has rights in this invention pursuant to Contract No. DE-AC04-76DP00789 between the Department of Energy and American Telephone and Telegraph Company.

FIELD OF THE INVENTION

This invention relates to particle suspensions which are thixotropic without the need for use of particles of a unique shape or the addition of an additive to render the particle suspension thixotropic. A method is described for production of thixotropic particle suspensions which is applicable to particles of any shape as suspended in polar or non-polar liquid mediums.

BACKGROUND OF THE INVENTION

The paint, ceramic, electronic and other industries utilize suspensions of particles in liquids as a stock material in the production of various end products, such as paints, ceramics, and electrical products. In many cases, these stock particle suspensions are stored without agitation and the particles, being of a greater density than the liquid, settle out due to the density mismatch and eventually form a hard sediment layer at the bottom of the storage container. This is undesirable since the particles comprising the sediment layer are generally difficult to redisperse into suspension to prepare the stock solution for use. It is therefore advantageous to have a particle suspension that is thixotropic so that for working purposes it is fluid during and immediately after shearing but when quiescent as during storage it will eventually and reversibly set up like a gel prior to significant sedimentation of its particles.

Some particle suspensions are naturally thixotropic. For example, particles that are of an anisotropic shape, i.e., of a plate or needle-like shape, generally form thixotropic suspensions. Further, with respect to particles suspended in a polar medium such as water, it is known that certain additives, such as salts or colloidal silica, can be added to render them thixotropic. In some cases these thixotropic inducing additives are otherwise undesirable, for example, they are undesirable in a ceramic sheet forming particle suspension since the additive cannot be removed by heating prior to use of the suspension. Hence, the thixotropic inducing additive becomes a part of the final product and in this context it may be considered to be an undesired contaminant.

Many end uses require the use of particles whose shape is not unique in nature and which will not therefore naturally result in a thixotropic suspension. With respect to such particles, they may be prepared as a thixotropic particle suspension only in an aqueous medium and then only by addition of a thixotropic inducing additive to the medium which, in many cases, may be an undesirable component in the final product to be produced from the particle suspension. Further, when the end use application requires the medium to be a non-polar liquid, such as is the case with an electrorheological fluid, it is even more difficult to prepare a suspension of equiaxed particles which is thixotropic.

Another approach which has been taken to reduce the rate of sedimentation of particles from a particle suspension which cannot be prepared in thixotropic form is to make the suspension shear thinning, meaning it has a higher viscosity when quiescent, but under application of shear, the viscosity decreases. Although this shear thinning approach may retard the rate at which sedimentation occurs, it does not totally prevent the occurrence of sedimentation or to be effective to inhibit particle settlement the suspension may have a thinned viscosity above that desirable for working purposes of the suspension.

To inhibit gravitational sedimentation of their particles during quiescent storage it is still a goal in this art to develop a method for forming particle suspensions that are thixotropic, irrespective of the shape of the particles, which is independent of the nature of the suspending liquid as being polar or non-polar, and which does not require the presence of an extrinsic thixotropic inducing additive.

SUMMARY OF THE INVENTION

This invention provides thixotropic particle suspensions and a method for preparing particle suspensions that are thixotropic irrespective of the shape of the particle, which is independent of the polar nature of the suspending liquid and which does not require the presence of an extrinsic thixotropic inducing additive. In the method of this invention, thixotropic behavior is introduced into the particle suspension by controlling the quantity of dispersant coating of the particles to a quantity that is less than that required to provide a full dispersant coating of all particles contained in the suspending liquid.

The method of this invention is applicable to equiaxed or anisotropic shaped particles as suspended in a polar or non-polar liquid by use of electrosteric or stearic stabilizing dispersants. The invention is particularly useful for preparing suspensions of particles of equiaxed shape in non-polar liquids which heretofore could not be prepared to have thixotropic properties. With this invention it is also possible to prepare suspensions of equiaxed particles in a polar liquid, such as aqueous solutions, which have thixotropic properties without the need for the presence of a thixotropic inducing additive as has heretofore been needed.

DETAILED DESCRIPTION OF THE PREFERRED EMBODIMENTS

Figure 1:
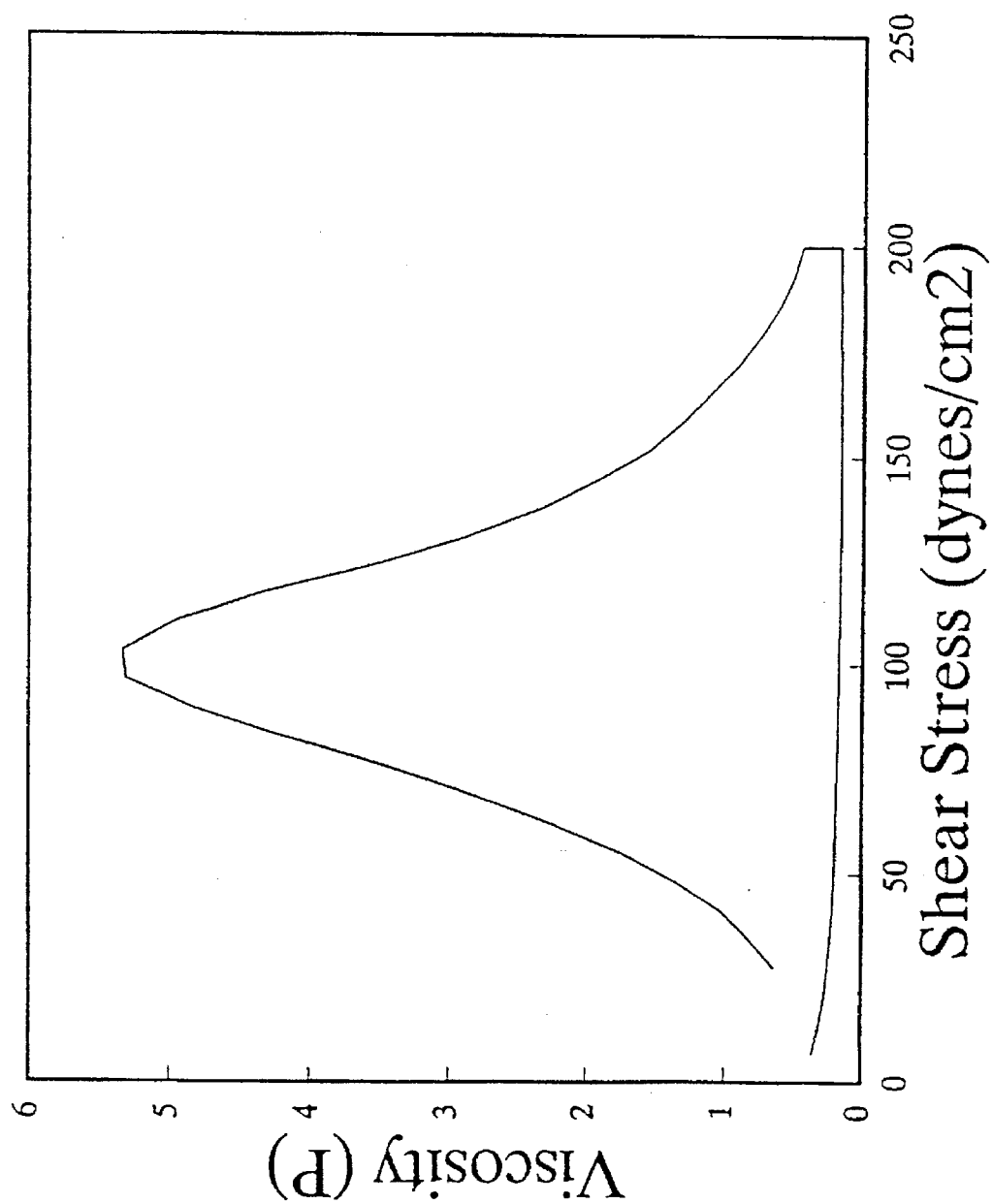
FIG. 1 is a plot of the viscosity of a 15 volume % alumina in dodecane suspension with 14.38 mg of 12-HSAE/g alumina as a function of shear rate with an equilibration time of 0 seconds, showing pronounced thixotropy, 12-HSAE meaning 12-hydroxy stearic acid ester.

Three components are employed to prepare particle suspensions. They are the particles to be suspended, the liquid medium in which the particles are suspended, and the dispersant composition with which the particles are coated to inhibit their coagulation while in the liquid medium. To this extent, the components of the particle suspension are standard and commonly used in preparing conventional particle suspensions. However, unlike previous techniques, in the method of this invention, the quantity of the dispersant composition is intentionally limited to a quantity which is less than that which would provide a completely stabilized suspension.

The particles of the suspension may be of any chemical composition heretofore employed in particle suspensions. Accordingly, the particles may be formed of simple or complex metal oxides, carbides and nitrides used in applications such as for pigments in paints and inks or the chain-forming phase in electrorheological fluids, or when as part of a process a colloidal suspension is used to facilitate the production of products such as ceramic dielectric, ferroelectrics or superconductors. The particles may be of any shape, anisotropic or equiaxed shapes, and the invention is particularly useful with respect to particles of equiaxed shape which heretofore could not be prepared as thixotropic aqueous suspensions without the aid of an extrinsic thixotropic inducing additive. With respect to equiaxed particles, those of an average dimension of 50 µm or less are preferred for use, and more preferably the average dimension of such particles are from about 0.05 to about 5 µm. Ferroelectric powders, such as of barium titanate, are examples of particles used to form electrorheological fluids by suspension in a non-conducting liquid medium.

The medium for suspension of the particles may be a polar or non-polar liquid, as may be desired. Polar mediums typically include water and polar organic compounds like alcohols, ketones, aldehydes, and nitrogen-containing solvents and the like. Of these polar mediums, water is the most often employed, hence is a preferred polar medium for use in this invention. Non-polar mediums typically include hydrocarbons, aromatic solvents, oils and the like. Of these non-polar mediums, the hydrocarbons such as hexane, heptane, octane, decane, dodecane, and the like are often used for electrorheological fluids, hence are a preferred non-polar medium for this use.

Dispersants used as particle coatings to inhibit coagulation of particles when preparing a particle suspension generally fall into two classes, namely electrosteric dispersants and steric dispersants. Electrosteric dispersants are those compositions which are ionized to a various degree depending upon the pH of the medium to which they are exposed and thus, as a particle coating, inhibit particle coagulation by a combination of electrostatic and steric repulsion. Steric dispersants are those compositions which are non-ionic and, as a particle coating, inhibit particle coagulation by steric repulsion or hindrance. Generally, electrosteric dispersants are only utilized as particle coatings for suspension in polar liquids and steric dispersants may be used as a particle coating for suspensions in either polar or non-polar liquids.

Whether a particle suspension is or is not intended or expected to have thixotropic properties, a dispersant of some kind must be utilized to coat the particles to be suspended to prevent their coagulation as a floc when suspended in the liquid medium. Conventionally, the particles are fully coated with a dispersant composition and an excess of the dispersant may even remain in solution in the medium in order to obtain a stable suspension, meaning one in which flocculation of the suspended particles does not occur. To this purpose, electrosteric dispersants commonly used include poly(acrylates) and poly(amines) some specific examples of which are ammonium poly(methacrylate), sodium poly(methacrylate), ammonium poly(acrylate) and poly(ethylene amine), and the like. Steric dispersants commonly used include long chain fatty acids, organosilanes or titanates, and other molecules consisting of a polar group and a non-polar chain, some specific examples of which are 12-hydroxy stearic acid ester, polyisobutylene succinamide, poly(octadecyl)methacrylate, oleic acid, stearic acid, $C_{18}H_{37}Si(OCH_3)_3$ and the like.

A thixotropic particle suspension is one that is interconvertible from a solid-like state (a gel) to a fluid state by application of a shear force to the solid-like state or, from a fluid state to a solid-like state by allowing the fluid to stand in a quiescent condition for a period of time. Preferably the time until gel formation occurs is of such duration that significant sedimentation of particles within the fluid does not occur during this gel or equilibrium time. To inhibit significant sedimentation through thixotropic behavior the gel time must be matched to the density difference existing between the particles and the liquid medium. The particle size and viscosity of the liquid medium also exert an influence on the gel time and sedimentation rate. Longer gel times are permissible with particles that more closely match the fluid density than with particles of significantly greater density for which shorter gel times are required.

In accordance with the principle of this invention, thixotropic behavior is introduced into a particle suspension by limiting the quantity of dispersant used with respect to the quantity of particles used such that all particles employed in the suspension cannot carry a full surface coating of the dispersant composition. In this aspect, all particles of the suspension may be partially but not fully coated with the dispersant composition or some particles may be fully coated while other particles are uncoated or are only partially coated by the dispersant composition. As such, the full quantity of particles to be used in forming the particle suspension may be prepared with a quantity of dispersant composition which is insufficient to fully coat all of the particles. Alternatively, of the full quantity of particles to be used, one portion thereof may be prepared with a quantity of dispersant sufficient to entirely coat these particles whereas a second portion may be totally untreated with dispersant or treated with a quantity of dispersant insufficient to entirely coat these particles, and thereafter both types of particles used to prepare the suspension.

The range of dispersant concentration, stated as an average of the dispersant quantity relevant to the total particle quantity, over which thixotropic behavior may be introduced into a particle suspension thereof is related to the particulars of a given suspension, such as particle type, size, surface area and density; suspension liquid type and density; and dispersant type and nature.

Thixotropic behavior through dispersant concentration control is more easily introduced into particle suspension systems wherein a steric dispersant composition is used in conjunction with particles of an average particle size of 50 µm or less, preferably an average particle size of from about 0.05 to about 5 µm and the ratio of particle density to liquid medium density is from about 1 to about 10, and preferably from about 1.5 to about 8. In this respect, this invention is especially well suited to the production of particle suspensions having thixotropic properties wherein the particles are of equiaxed shape and of submicrometer size as coated in part with a steric dispersant as suspended in a non-polar or polar liquid medium, particularly in a non-polar liquid medium. More difficult because the dispersant concentration range for thixotropic behavior is narrower, but still possible, is the introduction of thixotropic behavior into a particle suspension in a polar liquid medium wherein the dispersant is an electrosteric dispersant composition. In such particle suspensions, the pH of the liquid medium exerts a substantial influence on the thixotropic behavior of the suspension.

The quantity of a particular dispersant composition at which a particle of a particular type, size and density becomes fully coated by the dispersant may be determined by thermogravimetric analysis. The maximum amount of a dispersant that can be adsorbed on a particular particle may be determined using thermogravimetric analysis (TGA) in the following manner. A suspension of the particles with excess dispersant may be prepared and then repeatedly centrifuged, decanted, diluted and redispersed with fresh liquid medium in order to remove any unadsorbed dispersant. After final centrifugation, the particles may be dried at low temperature and then TGA performed in air. The amount of adsorbed dispersant is determined from the weight loss that occurs in the temperature range for pyrolysis of the particular dispersant used. This technique assumes that the dispersant coating burns off completely. As desired, the veracity of this assumption may be readily determined for any particular dispersant-particle system by performing TGA on particles containing a known amount of the dispersant.

For the particle and dispersant type in consideration, this maximum or full coating value of dispersant/particle concentration sets the dispersant concentration limit beyond which thixotropic behavior cannot be obtained in the particle suspension without further aid in the nature of a thixotropic inducing additive. At dispersant concentrations below this upper limiting value, the particle suspension formed from the so treated particles may exhibit a range of rheological properties ranging from unstable and flocculated, to shear thinning without thixotropy, to thixotropic. Thus, the lower limit of the dispersant/particle concentration is that at which thixotropic behavior is first observed by rheological measurements performed on a series of suspensions having a range of dispersant/particle concentrations. Within this range set by the lower and upper limits of the dispersant/particle concentration for thixotropic behavior, the gel time of the suspension may be varied by varying the dispersant concentration and/or the volume % of particles in suspension.

Again, with respect to particles, dispersants and liquid mediums of particular types, the dispersant concentration range over which thixotropic properties of a desirable gel time may be introduced into a particle suspension may be determined without undue experimentation. Although the precise particulars of one system will vary from those of another—the particulars being particle volume percent of total suspension, particle-liquid density mismatch, and dispersant concentration; all as related to the beneficial balance between gel time and sedimentation rate and the viscosity range between the fluid and gel state of the suspension—the following guidelines generally apply.

To produce a thixotropic suspension by control of the dispersant concentration given a particular powder, a solvent and dispersant pair that produces a sterically or electrosterically stabilized suspension when adequate dispersant is present must be chosen. This can be readily done for powders that have polar surfaces such as metal oxides by choosing a non-polar solvent such as a hydrocarbon and a dispersant with a polar part that interacts with the particles' surfaces and a chain part that is readily soluble in the solvent. If both the powder and the solvent are specified, then a dispersant that will stabilize the powder in that solvent preferably sterically but possibly electrosterically must be selected. Once the components of the suspension are set, the concentration of dispersant needed to fully coat all of the particles with a complete layer must be determined as described previously. This will depend on the surface area of the powder and the nature of the dispersant and solvent. Once this concentration is known, a series of suspensions should be prepared with a range of dispersant concentrations between the complete layer coverage amount and the minimum needed to produce a fluid suspension. It is preferable to prepare these suspensions at a relatively low volume % solids, about 10%, and then to concentrate them by centrifugation and removal of some of the supernatant. The suspensions can then be allowed to remain quiescent for some period of time on the order of several hours to a day and then checked to determine which formed a gel and are thus thixotropic and which are not. The amount of time waited should be enough so that a suspension of the same system but with enough dispersant to fully coat the particles will have undergone settling such that a compact forms on the bottom of the container. This amount of time will depend on the size of the particles, the density mismatch between the particles and the solvent and the viscosity of the solvent, according to Stoke's Law.

In further illustration of the invention but without intention to limit its scope and principles as so far described, the following examples of its practice are offered.

EXAMPLES

A high purity (99.99%) aluminum oxide (Sumitomo AKP-50) having an average particle size of 0.18 μm and a BET surface area of 9.7 m$^2$/g (according to the manufacturer) was used to prepare particle suspensions with dodecane (purified grade, Fisher Scientific, Pittsburgh, Pa.) using 12-hydroxy stearic acid ester (Hypermer LP1, MW=2000, ICI Surfactants, Wilmington, Del.) as a dispersant composition. Suspensions were prepared by mixing 10 volume % alumina ($Al_2O_3$) in dodecane and 12-hydroxy stearic acid ester (12-HSAE), sonicating the suspension for several minutes and then concentrating the solution to a final volume % concentration of $Al_2O_3$ by low speed centrifugation and removal of the requirement amount of supernatant after which the remainder was vigorously shaken. In this manner 15 volume % alumina suspensions were prepared having a 12-HSAE dispersant concentration of 14.38, 15.00, 15.63, 16.25 and 16.88 mg 12-HSAE/g $Al_2O_3$. At the 16.88 mg 12-HSAE/g $Al_2O_3$ concentration suspensions were also prepared at 25 and 30 volume % alumina.

The rheological properties of the suspensions were examined with a Carrimed Controlled Stress Rheometer using a double concentric cylinder cell. The inner and outer stationary cylinders were made of stainless steel while the movable middle cylinder was aluminum. The outer radius of the inner cylinder was 20 mm, the gap between cylinders was 0.5 mm, and the outer radius of the middle cylinder was 22 mm. The cell was filled to a height of 25 mm. The cell was contained in a constant temperature jacket and all measurements were performed at 20° C.

Measurements were performed using the following procedure. The suspensions were shaken vigorously just prior to introducing them into the cell. They were then presheared at a high shear rate prior to each run with the same sample to break up any structure that may have formed in the previous run. After preshearing, the samples were allowed to set at zero shear stress for a specified length of time. At the end of the equilibration time the stress was ramped up linearly to a specified maximum value while the shear strain rate was measured. The value of the shear stress when the shear rate became non zero was taken as the yield stress. After holding for one minute at the maximum stress, the stress was ramped down linearly.

The maximum amount of 12-HSAE that can be adsorbed on the alumina powder was determined using thermal gravimetric analysis (TGA). A suspension with excess dispersant was prepared and then repeatedly centrifuged, decanted, diluted and redispersed to remove any unadsorbed dispersant. After the final centrifugation, the powder was dried at low temperature and then TGA was performed in air. The amount of adsorbed dispersant was determined from the weight loss that occurred in the temperature range of dispersant pyrolysis. The maximum absorbed amount of the 12-HSAE on the alumina powder was determined as 30.1 mg/g alumina.

The sterically stabilized suspensions in dodecane were extremely thixotropic for a range of dispersant concentrations. FIG. 1 shows the viscosity versus shear stress for a 15 volume % suspension with 14.38 mg of 12-HSAE/g alumina for a ramp up, hold and ramp down run with zero equilibration time. Thixotropy is indicated by the difference between the viscosity during the ramp up, which goes through a maximum of about 5 P, and that during the ramp down, which is nearly constant at about 0.2 P.

Figure 2:
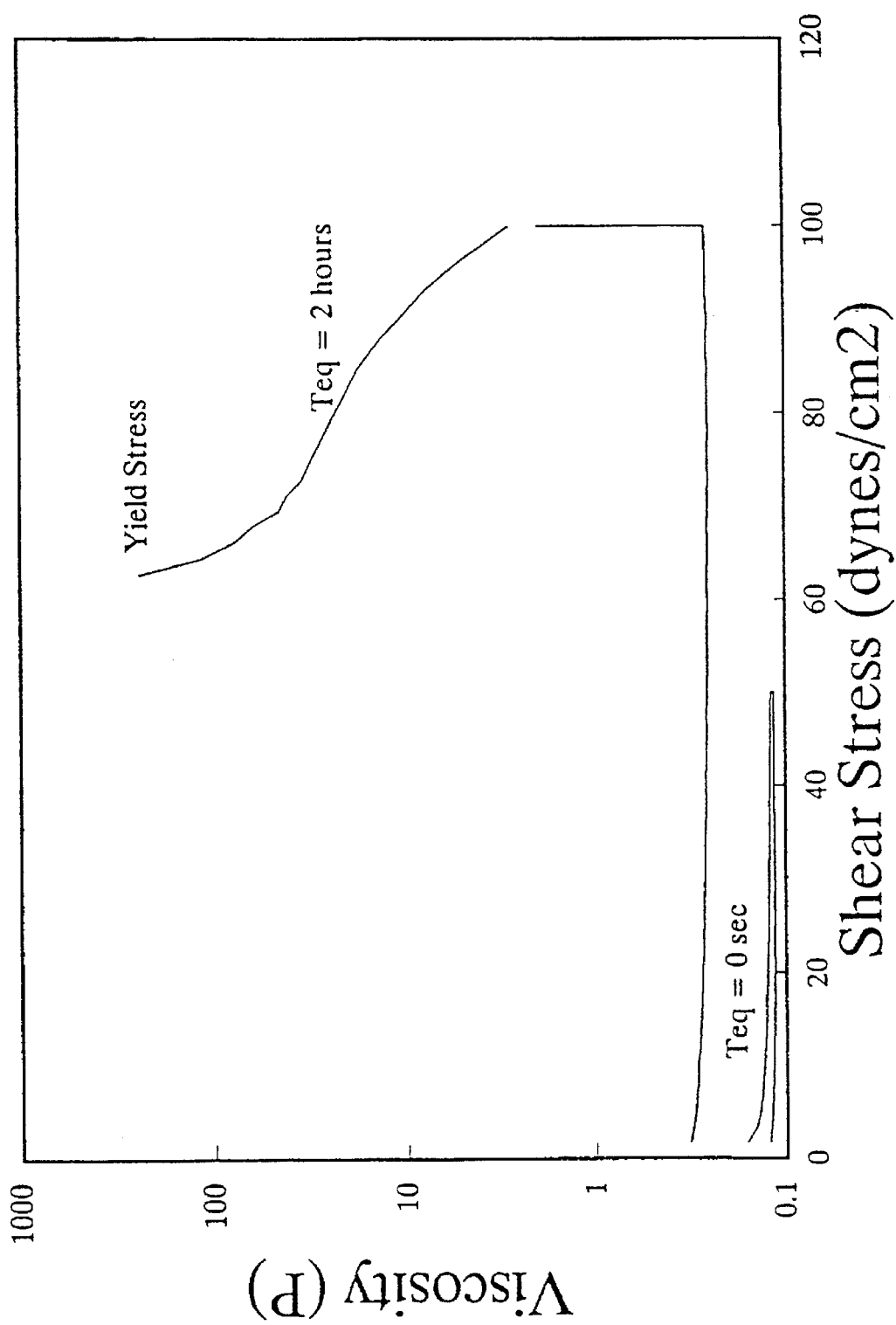
FIG. 2 is a plot of the effect of equilibration time on the rheological behavior of a 15 volume % alumina in dodecane suspension with 16.25 mg of 12-HSAE/g alumina.

FIG. 2 shows the effect of equilibration time on a 15 volume % alumina in dodecane suspension with 16.25 mg 12-HSAE/g alumina. When the equilibration time was zero, the suspension is virtually non-thixotropic. However, when the equilibration time was 2 hours the suspension had a yield stress of 62 dynes/cm$^2$ and its viscosity then decreased by more than 2 orders of magnitude during the rest of the ramp up and hold. During the ramp down its viscosity was low and constant.

Figure 3:
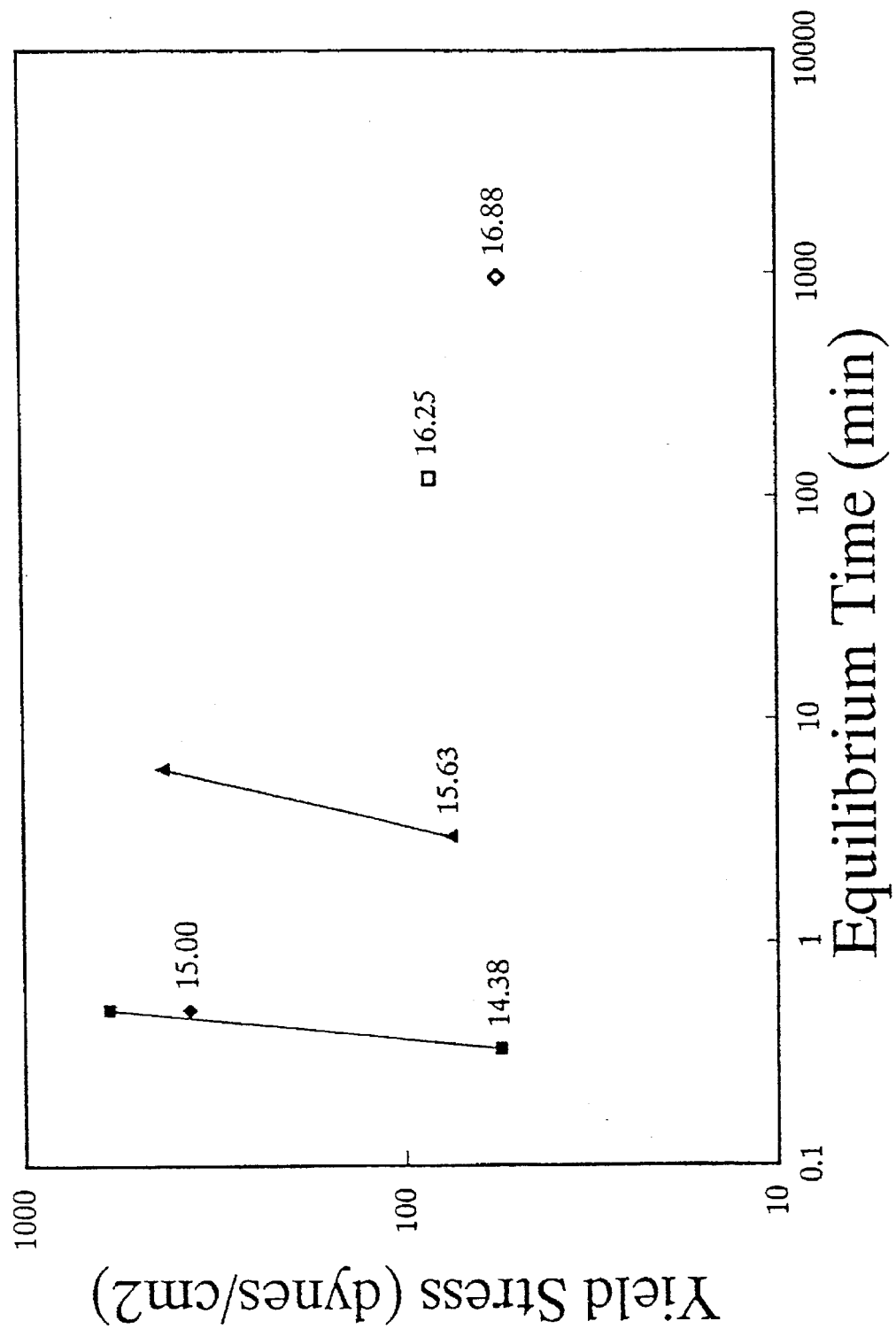
FIG. 3 is a plot of the dependence of the yield stress of 15 volume % alumina in dodecane suspensions on the concentration of 12-HSAE (shown as the numbers next to the points in units of mg 12-HSAE/g alumina) and on the equilibration time.

FIG. 3 shows that the yield stress of 15 volume % alumina in dodecane suspensions depends very strongly on the equilibration time and on the concentration of 12-HSAE. For example, when the equilibration time was increased from 20 to 30 seconds for a 14.38 mg/g suspension, the yield stress increased by more than an order of magnitude. Also, when the dispersant concentration was increased to 16.88 mg/g, an increase of 18%, the equilibration time needed to produce a comparable yield stress increases by over three orders of magnitude.

Figure 4:
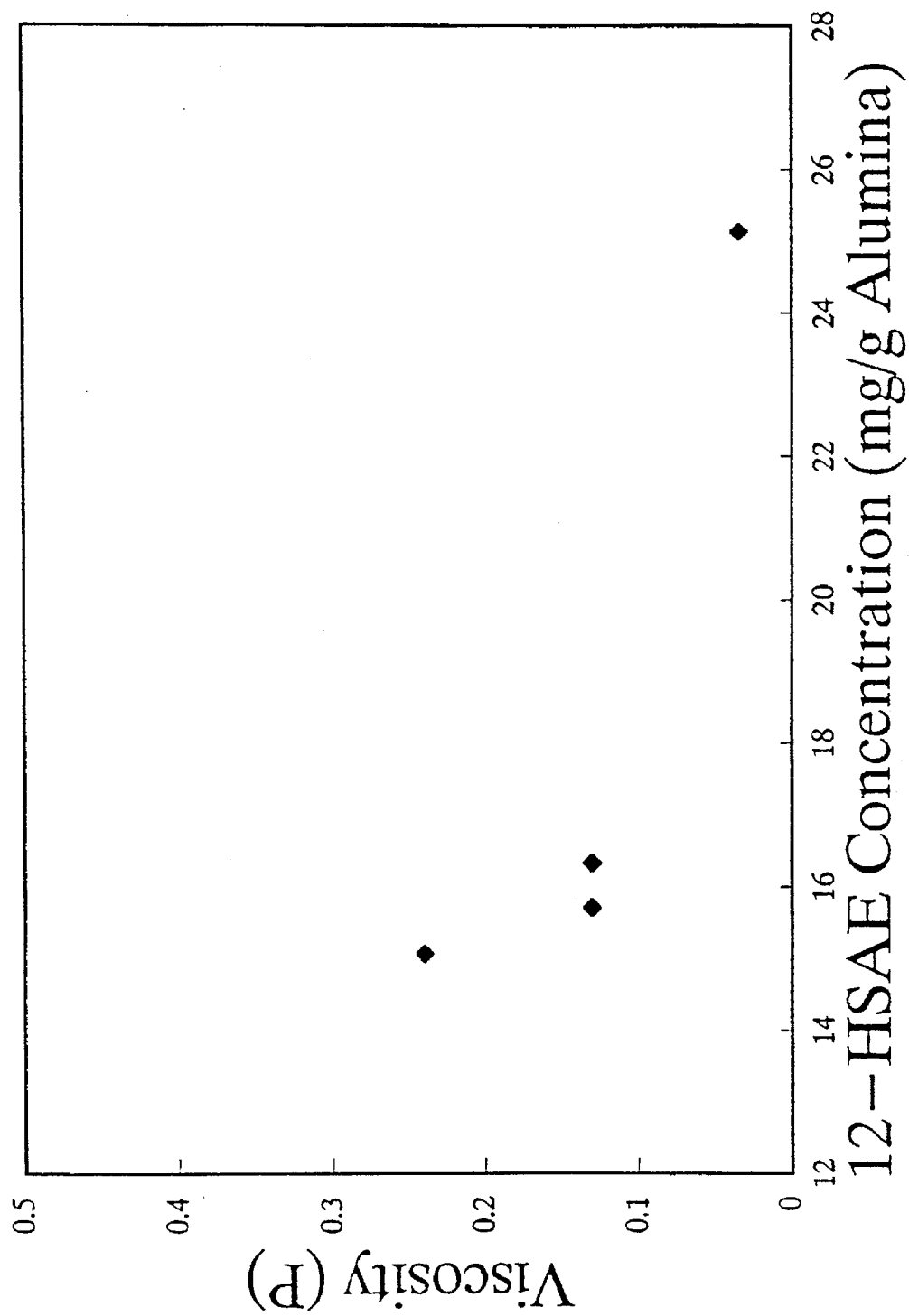
FIG. 4 is a plot of the viscosity of 15 volume % alumina in dodecane suspensions after shearing as a function of dispersant concentration.

In FIG. 4 the viscosity of a 15 volume % alumina suspension in dodecane after high shear is plotted as a function of the dispersant concentration. As the figure shows, there was a slight increase in the viscosity of the thixotropic suspensions (14–17 mg/g) as compared to that of a well dispersed, non-thixotropic suspension (25 mg/g).

Figure 5:
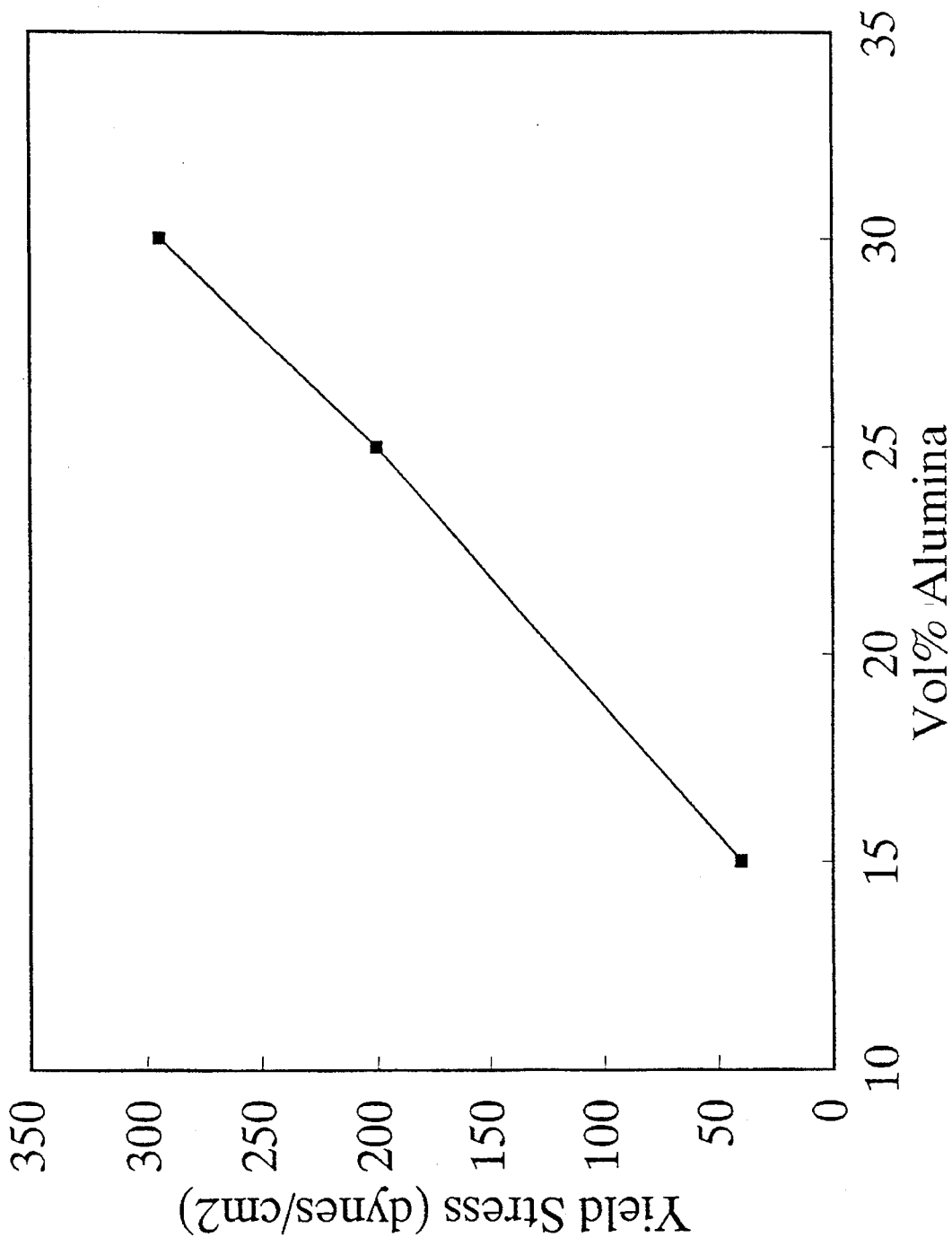
FIG. 5 is a plot of the yield stress of alumina in dodecane suspensions showing yield stress to increase linearly with alumina content. The dispersant concentration is 16.25 mg of 12-HSAE/g alumina and the equilibration time is 4 hours.

FIG. 5 shows that in the alumina-dodecane system, the yield stress increased approximately linearly with the volume of alumina present for a dispersant concentration of 16.25 mg/g and an equilibration time of 4 hours.

From the description of the invention as here provided, one skilled in the art may appreciate modification and changes that depart from the particularities of this description but which are encompassed within the spirit and scope of the invention as described before and claimed hereafter.

I claim:

1. A method of preparing a particle suspension having thixotropic behavior, comprising the steps of:

treating particles with a dispersant to form particles having a quantity of dispersant coating which is less than that quantity of dispersant which would provide a full dispersant coating on all particles, and suspending the dispersant treated particles in a liquid medium.

2. The method of claim 1, wherein the particles are equiaxed and have an average dimension 50 µm or less.

3. The method of claim 2, wherein the dispersant is a steric dispersant.

4. The method of claim 3, wherein the liquid medium is a non-polar liquid.

5. The method of claim 4, wherein the non-polar liquid is a hydrocarbon.

6. The method of claim 5, wherein the particles are a ferroelectric powder.

7. The method of claim 6, wherein the particles have an average dimension of from about 0.05 to about 5 µm.

8. The method of claim 3, wherein the dispersant is a long chain fatty acid, an organosilane, or an organotitanate.

9. The method of claim 3, wherein the dispersant composition is 12-hydroxy stearic acid ester, polyisobutylene succinamide or poly(octadecyl) methacrylate.

10. A thixotropic particle suspension, comprising:

particles treated with a dispersant in a quantity which is less than that quantity of the dispersant which would provide a full dispersant coating on all particles, and a liquid medium containing the treated particles.

11. The thixotropic particle suspension of claim 10, wherein the liquid medium is a non-polar liquid.

12. The thixotropic particle suspension of claim 11, wherein the particles are a ferroelectric powder.

13. The thixotropic particle suspension of claim 12, wherein the liquid medium is a hydrocarbon and the particles are barium titanate.

14. The thixotropic particle suspension of claim 11, wherein the particles are equiaxed having an average dimension of 50 µm or less.

15. The thixotropic particle suspension of claim 14, wherein the dispersant is a steric dispersant.

16. The thixotropic particle suspension of claim 15, wherein the dispersant is a long chain fatty acid, an organosilane or an organotitanate.

17. The thixotropic particle suspension of claim 15, wherein the dispersant is 12-hydroxy stearic acid ester, polyisobutylene succinamide or polyoctadecylmethacrylate.

18. The thixotropic particle suspension of claim 15, wherein the particles have an average dimension of form about 0.05 to about 5.0 µm.

* * * * *